United States Patent
Dhawan

(10) Patent No.: US 11,501,091 B2
(45) Date of Patent: *Nov. 15, 2022

(54) REAL-TIME SPEECH-TO-SPEECH GENERATION (RSSG) AND SIGN LANGUAGE CONVERSION APPARATUS, METHOD AND A SYSTEM THEREFORE

(71) Applicant: Sandeep Dhawan, Westbury, NY (US)

(72) Inventor: Sandeep Dhawan, Westbury, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,181

(22) Filed: Jun. 11, 2022

(65) Prior Publication Data
US 2022/0327294 A1    Oct. 13, 2022

Related U.S. Application Data

(63) Continuation-in-part of application No. 17/645,973, filed on Dec. 24, 2021, now Pat. No. 11,361,780.

(51) Int. Cl.
| | |
|---|---|
| *G10L 15/16* | (2006.01) |
| *G06F 40/58* | (2020.01) |
| *G10L 13/047* | (2013.01) |
| *G10L 15/00* | (2013.01) |
| *G10L 13/033* | (2013.01) |

(52) U.S. Cl.
CPC .......... *G06F 40/58* (2020.01); *G10L 13/0335* (2013.01); *G10L 13/047* (2013.01); *G10L 15/005* (2013.01); *G10L 15/16* (2013.01)

(58) Field of Classification Search
None
See application file for complete search history.

(56) References Cited

U.S. PATENT DOCUMENTS

| | | | | |
|---|---|---|---|---|
| 6,377,925 B1 * | 4/2002 | Greene, Jr. | ............. | G10L 21/06 704/235 |
| 8,330,864 B2 * | 12/2012 | Blumenschein | ... | H04N 21/4884 375/240.26 |
| 2004/0143430 A1 * | 7/2004 | Said | ........................ | G06F 40/12 704/2 |
| 2009/0234636 A1 * | 9/2009 | Rylander | ................ | G06F 40/58 704/3 |
| 2015/0227510 A1 * | 8/2015 | Shin | ........................ | G10L 15/04 704/2 |

(Continued)

*Primary Examiner* — Neeraj Sharma

(57) ABSTRACT

A real-time speech-to-speech generator and sign gestures converter system is disclosed. The system is still challenging for deaf or hearing impaired people. Embodiments of the invention provide direct speech to speech translation system and further conversion to sign gestures is disclosed. Direct speech to speech translation and further sign gesture conversion uses a one-tier approach, creating a unified-model for whole application. The single-model ecosystem takes in audio (MEL spectrogram) as an input and gives out audio (MEL spectrogram) as an output to a speech-sign converter device with a display. This solves the bottleneck problem by converting the translated speech directly to sign language gesture from first language with emotion by preserving phonetic information along the way. This model needs parallel audio samples in two languages. The training methodology involves augmenting or changing both sides of the audio equally and later converts to sign gestures which are being displayed on a speech-sign converter device.

19 Claims, 8 Drawing Sheets

(56) References Cited

U.S. PATENT DOCUMENTS

| | | | |
|---|---|---|---|
| 2017/0236450 A1* | 8/2017 | Jung | G10L 15/26 |
| | | | 704/3 |
| 2018/0047387 A1* | 2/2018 | Nir | G10L 15/02 |
| 2019/0138603 A1* | 5/2019 | Daley | G06F 3/165 |
| 2019/0315227 A1* | 10/2019 | Kim | G06V 40/28 |
| 2020/0075011 A1* | 3/2020 | Yao | G06V 40/171 |
| 2020/0226327 A1* | 7/2020 | Matusov | G06F 40/58 |
| 2022/0139417 A1* | 5/2022 | Maxwell | H04N 7/147 |
| | | | 704/235 |

\* cited by examiner

REAL-TIME SPEECH-TO-SPEECH GENERATION (RSSG) AND SIGN LANGUAGE CONVERSION APPARATUS, METHOD AND A SYSTEM THEREFORE

CROSS REFERENCE TO RELATED APPLICATIONS

This application claims the benefit of U.S. provisional patent application Ser. No. 17/645,973 titled "Real-time speech-to-speech generation (RSSG) apparatus, method and a system therefore", filed by Sandeep Dhawan et al on Dec. 24, 2021. The provisional patent application is incorporated herein by reference.

TECHNICAL FIELD

The present invention relates generally to the field of Speech-to-speech translation, more particularly related to direct speech-to-speech translation without text conversion to thereby automatically translate from a speech to a sign in real time.

BACKGROUND

Speech-to-speech translation is the process by which conversational spoken phrases are translated and spoken aloud in a second language. This differs from phrase translation, which is where the system only translates a fixed and finite set of phrases that have been manually entered into the system.

Speech-to-speech translation systems have been developed over the past several decades with the goal of helping people who speak different languages to communicate with each other. Such systems have usually been broken into three separate components: automatic speech recognition to transcribe the source speech as text, machine translation to translate the transcribed text into the target language, and text-to-speech synthesis (TTS) to generate speech in the target language from the translated text. Dividing the task into such a cascade of systems has been very successful, powering many commercial speech-to-speech translation products, including Google Translate.

Conventional speech to speech translation systems involves three different stages Speech to Text (Source Language), Text Translation, and Text to Speech (Target Language). However, physical models need to be included for each stage separately, and most often, model needs to be changed based on the complexity of the sub-task. The available techniques using old technologies such as hidden Markov mode (HMM) and/or Gaussian Markov mode (GMM) is not scalable to larger datasets as they have a relatively shorter ceiling of learning.

US patent application US20070208569 is one such patent which uses emotion database similar to speaker verification and is limited by emotional range in terms of words. It misses out on the phonetic nuances. The more recent deep learning models that have a higher learning ceiling also suffer from information loss due to being separately trained and cascaded, Similarly, three services to be used in each one of the available techniques Speech to Text: ASR, Translation: NMT, Text to Speech: TTS. Further, services (with Paid API Access) that are widely used include Google Speech to Text, IBM Watson, SpeakAI, and Microsoft Cognitive Services.

Thus, most of the conventionally available techniques have critical drawbacks of information loss as the essential information is lost during speech to text conversion. Information can include but is not limited to gender of speaker, age of speaker dialect, accent emotions intonation intent, statement command statement, confirmation-seeking, educational background, cooperativeness of speaker, background conditions and channel information such as but not limited to echo, reverb, noises of different kinds, which are usually present in the surrounding environment where speech is uttered, artificially induced background such as in movies or pre-recorded conversations, music, etc.

Also, the direct speech to speech translation system has the potential of becoming more accurate than a conventional system because errors do not trickle down three separate systems. The direct speech to speech translation system doesn't employ any voice cloning mechanism but related papers do mention use of a cloning system that works on speaker-centric data. The direct speech to speech translation system does Spanish to English as a prototype but has the potential of translating multiple languages into multiple languages.

Further, according to global estimates released by the World Health Organization (WHO), as of February, 2013, more than 360 million people in the world, which is greater than the population of the United States, have hard-hearing. Further, according to statistics of e-Nation Index, as of December, 2014, about a quarter of a million people have hard-hearing in Korea. Impairment by loss of physiological function, including hearing impairment, causes physiological and functional issues and serious issues in financial, social, and emotional aspects as well. Accordingly, media regulation organizations of all over the world start to deal with hearing impairment as an issue of fundamental human rights to improve such issues caused by hearing impairment, and provide three major types of services. A subtitle service includes closed captioning (CC), subtitles for hard of hearing (HoH), and subtitles for deaf and hard of hearing (SDF) which all help a hearing-impaired person not to experience alienation in everyday life. However, each of these types of services has their own limitations.

Further, a dire need exists to generate a sign language in real-time for hard-hearing people once the speech to speech translation is completed.

SUMMARY OF THE INVENTION

To summarize the above, information loss in speech to text conversion and inability to hear the translated language with preserved liable vocal emotion information, background information, voice channel conditions and artificially induced audio in a conventional speech to speech translation system are essential drawbacks of the conventional techniques.

Embodiments of the invention provide direct speech to speech translation system is disclosed that solves the above recited issues. The presented direct speech to speech translation system provides direct speech to speech translation system and specific training methodology to preserve essential information of the audio signal in the task of speech to speech translation. It further generates a sign language in real-time for hard-hearing/deaf or hearing impaired people once the speech to speech translation is completed.

All objects, features and advantages of the present invention will become apparent in the following detailed written description.

The Summary is neither intended nor should it be construed as being representative of the full extent and scope of the present invention, which these and additional aspects will become more readily apparent from the detailed description, particularly when taken together with the appended drawings.

Direct speech to speech translation system uses a one-tier approach, creating a unified-model for whole application. The single-model ecosystem takes in audio waveform—a time domain signal, preprocesses it into a frequency domain signal such as a mel spectrogram and gives out a frequency domain signal such as a mel spectrogram to be converted to an audio waveform. The model solves the bottleneck problem by not converting speech directly to text but having text as a byproduct of speech to speech translation, preserving phonetic information along the way. This model also uses pre-processing and post-processing scripts but only for the whole model.

In one embodiment, the Speech to Speech model needs parallel audio samples in two languages. For instance, in the case of Spanish to English Speech to Speech translation, the model would need training samples of audio spoken in Spanish and corresponding English audio. These are called "parallel samples". The parallel samples can optionally include Spanish and English text as well. The text helps the model train faster.

The training methodology involves augmenting or changing both sides of the audio equally (audio in the first language and the audio in the second language). The Spanish and English specification is an example and does not represent the model's limitation in understanding languages. The Speech to Speech model generalises well on any language pairs.

To allow the model to learn background and other information mentioned in the aforementioned text, the parallel samples could be augmented by one or all of the following data augmentation techniques. In the proposed model, augmentations need to be applied equally on both sides of the parallel samples. In case of Spanish to English conversion, the augmentation needs to be applied to audio samples of Spanish and English equally, and to the same extent.

To allow the model to generate a sign language in real-time for hard-hearing people once the speech to speech translation is completed, it performs below preferably steps:
  recognize a speech language converted by the Speech to Speech model (as discussed above briefly) via a speech-sign converter device and output/generate a sign language corresponding to the recognized speech language via a display.
  wherein the speech-sign converter device comprises a sign category keyword comparator configured to compare a pre-stored sign category information having one or more signs (sign gestures) with the outputted/generated sign for the recognized speech language to determine whether the outputted/generated sign is correct, and
  wherein the sign category keyword comparator transmits a signal related to whether the outputted/generated sign is correct to the speech-sign converter before displaying on the speech-sign converter device.

Following are preferable set of augmentation techniques that can be directly applied to the parallel samples.
  Synthetically generate noise from various types of sources and add them to the voice signal so the original sound appears noisy with the noise that gets added to the audio
  Artificially manipulate channel parameters equally for the parallel samples. The parameters could include, but are not limited to, echo, reverb, pitch, impulse response, placement of source and listeners, etc.
  Artificially change the pitch, intonation of the audio by signal processing techniques.
  Artificially augmenting the signal by use of another system such as a neural network, a machine learning technique or other methods
  Artificially creating room effect by simulating multiple room types and placing noise sources at a single place or multitude of places within a room while placing the listener in a different place that could be either close or far from the noise sources
  Artificially create and one of the above or multiple augmentations and place them within the room to create more diverse room effects Accordingly, in contrast to the conventional systems, the direct speech to speech translation system of the present invention prevents information loss and helps avoid information bottlenecks.

Speech to Speech translation can be used with existing voice chat applications and could potentially bridge the gap between multi-lingual e-commerce store owners and their customers. The Speech to Speech translation can also be used with live phone-calls and voice messages where a speaker speaks from one end in the first language while the listener listens to the voice in another language from the other end. With the advent of new ways in human interaction, audio recognition is increasingly becoming more common in the industry. As WhatsApp, Signal and other chat applications improve their audio chatting services and, as businesses turn towards these chat applications for customer interaction and services, there seems to be a potential market for including multi-lingual interactions here. These conversations can also sound a lot more interactive if they're translated into the voice of the same speaker who spoke the original sentence, preserving the phonetics of the person speaking the sentence. Also, the benefits of the conversion/translation into second language from first language can be transferred to the hearing impaired peoples who are also the part of our society and the user of such communication device such as but not limited to mobile phones or smart phones and laptops.

The method can be configured to be implemented in the form of a software or a plugin or as mobile application.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

The diagrams are for illustration only, which thus is not a limitation of the present disclosure, and wherein.

DETAILED DESCRIPTION OF DRAWINGS

Figure 1:
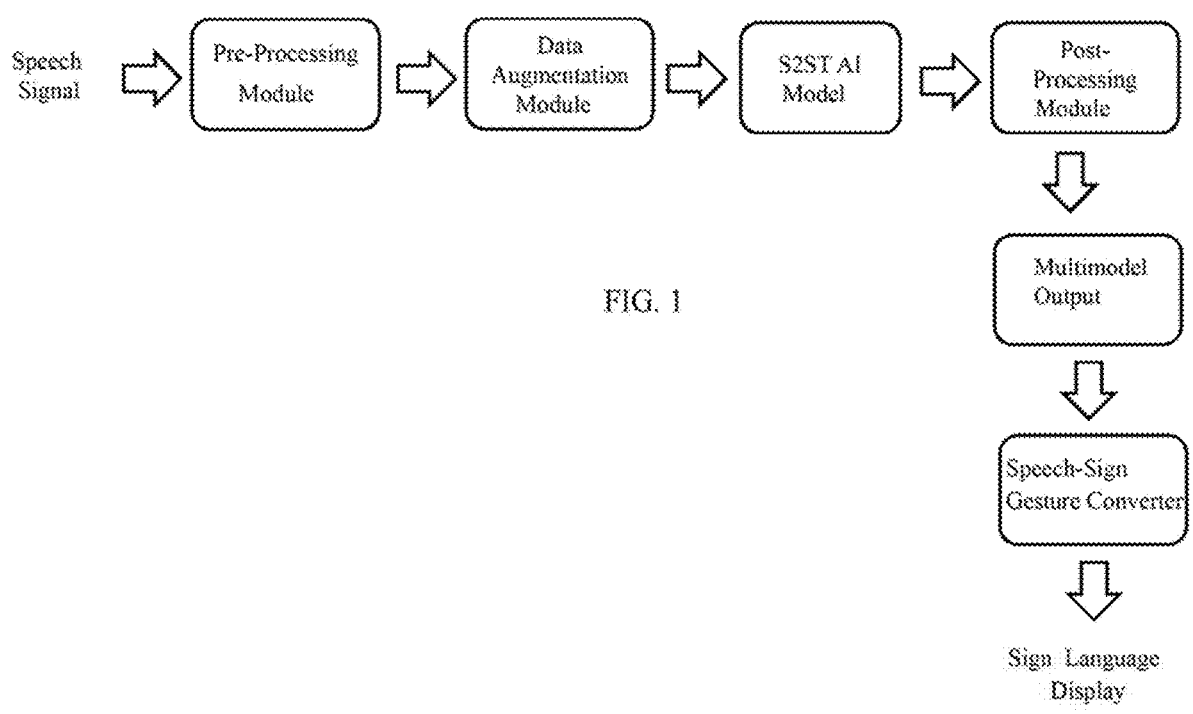
FIG. 1 is a block diagram illustrating a context adaptable speech-to-speech translation system, according to an embodiment of the present invention.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure.

In the following description, numerous specific details are set forth in order to provide a thorough understanding of embodiments of the present invention. It may be apparent to one skilled in the art that embodiments of the present invention may be practiced without some of these specific details.

Various terms as used herein are shown below. To the extent a term used, it should be given the broadest definition persons in the pertinent art have given that term as reflected in printed publications and issued patents at the time of filing.

Embodiments of the invention provide direct speech to speech translation system is disclosed that solves the above recited issues. The presented direct speech to speech translation system Provides direct speech to speech translation system and specific training methodology to preserve essential information of the audio signal in the task of speech to speech translation.

In an embodiment, direct speech to speech translation system uses a one-tier approach, creating a unified-model for whole application. The single-model ecosystem takes in audio (mel spectrogram) as an input in time domain signal and gives out audio (mel spectrogram) as an output in time domain signal. The model solves the bottleneck problem by not converting speech directly to text but having text as a byproduct of speech to speech translation, preserving phonetic information along the way. This model also uses preprocessing and post-processing scripts but only for the whole model.

In this embodiment, the Speech to Speech model needs parallel audio samples in two languages. For instance, in the case of Spanish to English Speech to Speech translation, the model would need training samples of audio spoken in Spanish and corresponding English audio. These are called "parallel samples". The parallel samples can optionally include Spanish and English text as well. The text, in some cases, helps the model train faster.

The training methodology involves augmenting or changing both sides of the audio equally (audio in the first language and the audio in the second language). The Spanish and English specification is an example and does not represent the model's limitation in understanding languages. The Speech to Speech model generalises well on any language pairs.

To allow the model to learn background and other information mentioned in the aforementioned text, the parallel samples could be augmented by one or all of the following data augmentation techniques. In the proposed model, augmentations need to be applied equally on both sides of the parallel samples. In case of Spanish to English conversion, the augmentation needs to be applied to audio samples of Spanish and English equally.

Following are preferable set of augmentation techniques that can be directly applied to the parallel samples.

Synthetically generate noise from various types of sources and add them to the voice signal so the original sound appears noisy with the noise that gets added to the audio Artificially manipulate channel parameters. The parameters could include, but are not limited to, echo, reverb, pitch, impulse response, placement of source and listeners, etc.

Artificially change the pitch, intonation of the audio by allowing

Artificially augmenting the signal by use of another system such as a neural network, a machine learning technique or other methods Artificially creating room effect by simulating multiple room types and placing noise sources at a single place or multitude of places within a room while placing the listener in a different place that could be either close or far from the noise sources Artificially create one of the above or multiple augmentations and place them within the room to create more diverse room effects.

Figure 2A:
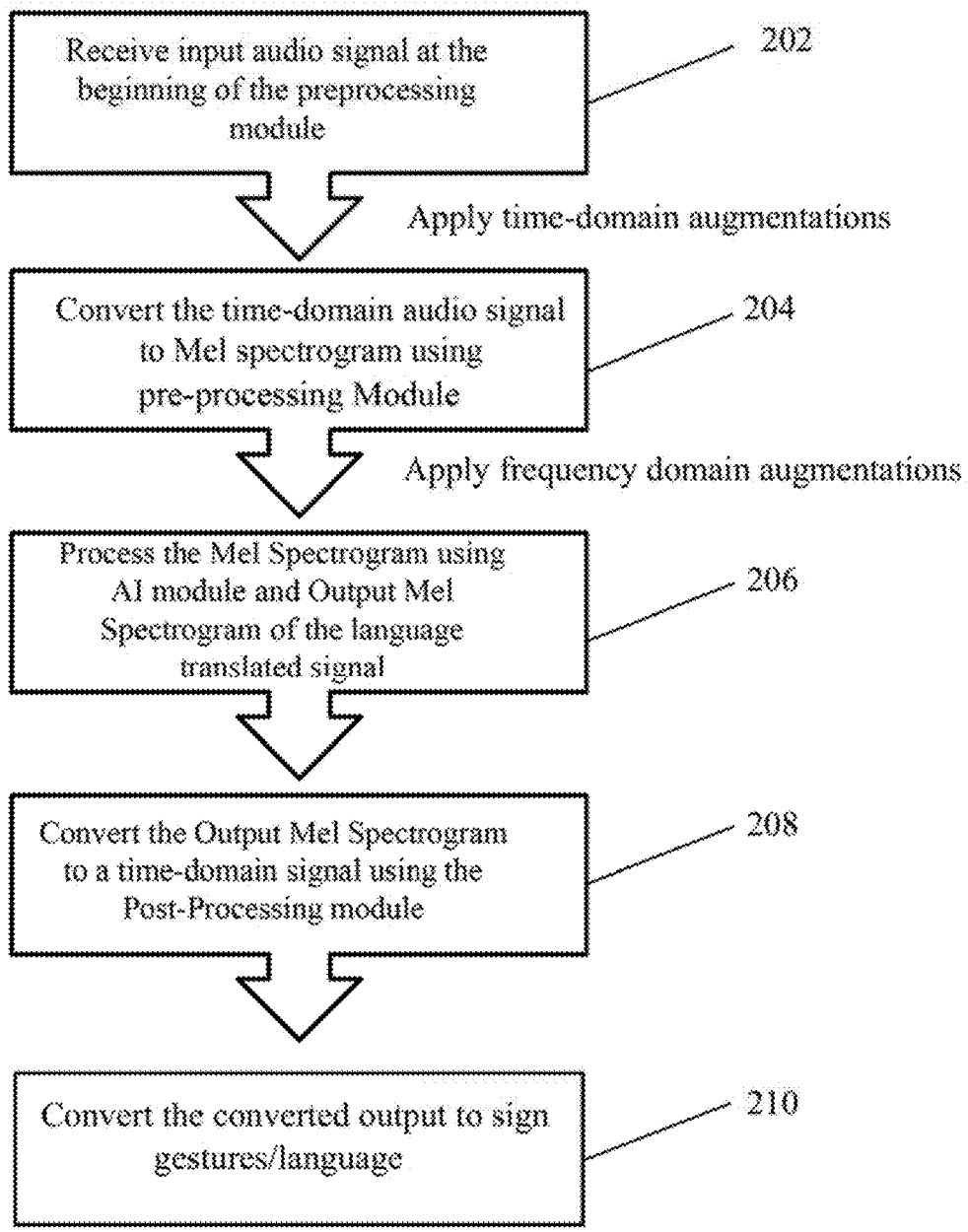
FIG. 2A is a flow diagram illustrating a translation system speech-to-speech translation system, according to an embodiment of the present invention.

FIG. 1 is a block diagram illustrating a context adaptable speech-to-speech translation system, according to an embodiment of the present invention. FIG. 2A is a flow diagram illustrating a translation system speech-to-speech translation system, according to an embodiment of the present invention.

In an embodiment, FIGS. 1 and 2A provides a real-time speech-to-speech generator and sign gestures conversion method. The method includes the steps of receiving (202) an input audio signal in a first language, applying the time-domain augmentation to the received input audio signal, wherein the input audio signal is a first time domain signal, converting (204) the first time domain signal into a MEL spectrogram; applying the frequency domain augmentation to the MEL spectrogram, processing (206) the converted MEL spectrogram using one or more Digital Signal Processing (DSP), Artificial Intelligence (AI) or related techniques to obtain an output MEL spectrogram of the language translated signal; and converting (208) the obtained output MEL spectrogram into a second time domain signal, wherein the second time domain signal is an output audio signal in a second language; wherein the real-time speech-to-speech generator and sign gestures converter apparatus is configured to convert the input audio signal in the first language directly into the output audio signal in the second language without requirement of any speech to text conversion as an intermediate step. Further converting the output second language into sign language (210) by preserving the phonetics, noise and background information.

In an exemplary embodiment, the input audio signal comprises one or more paragraphs spoken by a user in the first language, and wherein the output audio signal comprises audio of one or more translated paragraphs of the one or more paragraphs spoken in the second language.

In an exemplary embodiment, the one or more paragraphs include textual data that has context and content.

In an exemplary embodiment, the input audio signal is split into multiple signals for converting into the MEL spectrogram.

In an exemplary embodiment, the method further comprising: pre-processing the first time domain signal before converting into the MEL spectrogram by using at least one of the techniques such as machine-learning, signal processing, stats-based pre-processing, Digital Signal Processing, or data normalization for data augmentation on the first time domain signal.

In an exemplary embodiment, the method further comprising: converting the input audio signal in the first language directly into the output MEL spectrogram of the second language by preserving phonetic information, which is then converted to an audio signal using the post-processing module.

Figure 2B:
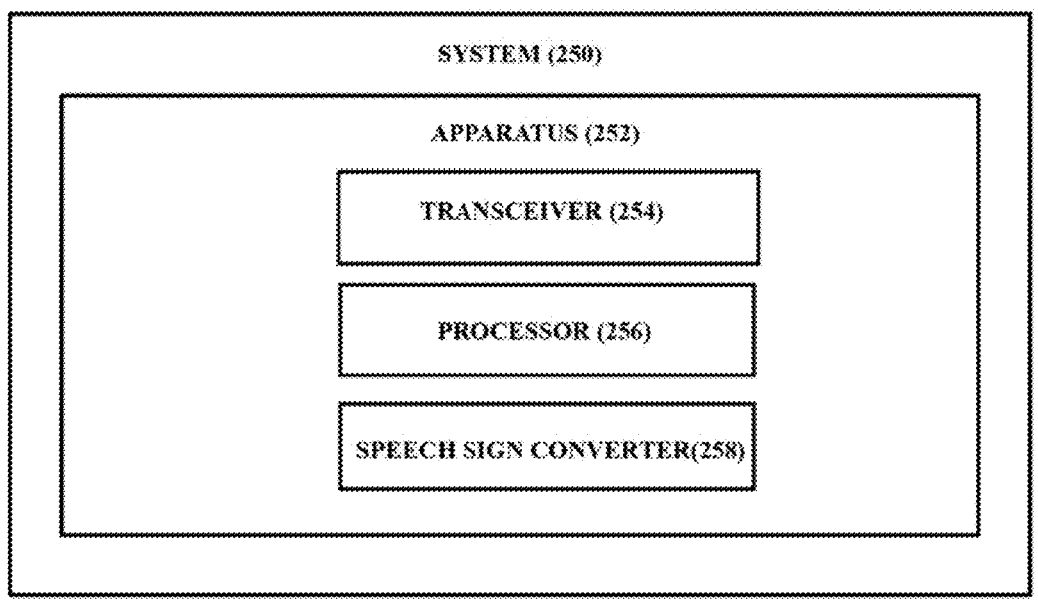
FIG. 2B is a system diagram illustrating a translation system speech-to-speech translation system, according to an embodiment of the present invention.

FIG. 2B is a system diagram illustrating a translation system speech-to-speech translation system, according to an embodiment of the present invention. A real-time speech-to-speech generator and sign gestures converter system (250) is disclosed. The real-time speech-to-speech generator and sign gestures converter system includes a transceiver (254) configured to receive an input audio signal in a first language, the input audio signal is a first time domain signal; and a real-time speech-to-speech generator and sign gestures converter apparatus (252) having a processor (256) configured to: convert the first time domain signal into a MEL spectrogram; process the converted MEL spectrogram using one or more Artificial Intelligence (AI) techniques to obtain an output MEL spectrogram of the language translated signal; and convert the obtained output MEL spectrogram into a second time domain signal, wherein the second time domain signal is an output audio signal in a second language and speech sign converter (258) to convert the second language output to sign language.

In an exemplary embodiment, the first language and the second language are different languages.

In an exemplary embodiment, the input audio signal comprises one or more paragraphs spoken by a user in the first language, and wherein the output audio signal comprises one or more translated paragraphs of the one or more paragraphs spoken in the second language.

In an exemplary embodiment, the one or more paragraphs include textual data that has context and content.

In an exemplary embodiment, the input audio signal is split into multiple signals for converting into the MEL spectrogram.

In an exemplary embodiment, the processor pre-processes the first time domain signal before converting into the MEL spectrogram by using techniques for data time domain data augmentation on the first time domain signal.

In an exemplary embodiment, the processor pre-processes the first time domain signal before converting into the MEL spectrogram by using at least one of machine-learning, signal processing techniques, statistic-based pre-processing technique, Digital Signal Processing techniques, data normalization techniques for data augmentation on the first time domain signal.

In an exemplary embodiment, the real-time speech-to-speech generator and sign gestures converter apparatus is configured to convert the input audio signal in the first language directly into the output audio signal in the second language without requirement of any speech to text conversion as an intermediate step.

In an exemplary embodiment, the real-time speech-to-speech generator and sign gestures converter apparatus is configured to convert the input audio signal in the first language directly into the output audio signal in the second language by preserving phonetic information and further convert the second language output into sign language to be read by the user in second language on a display device.

Figure 3:
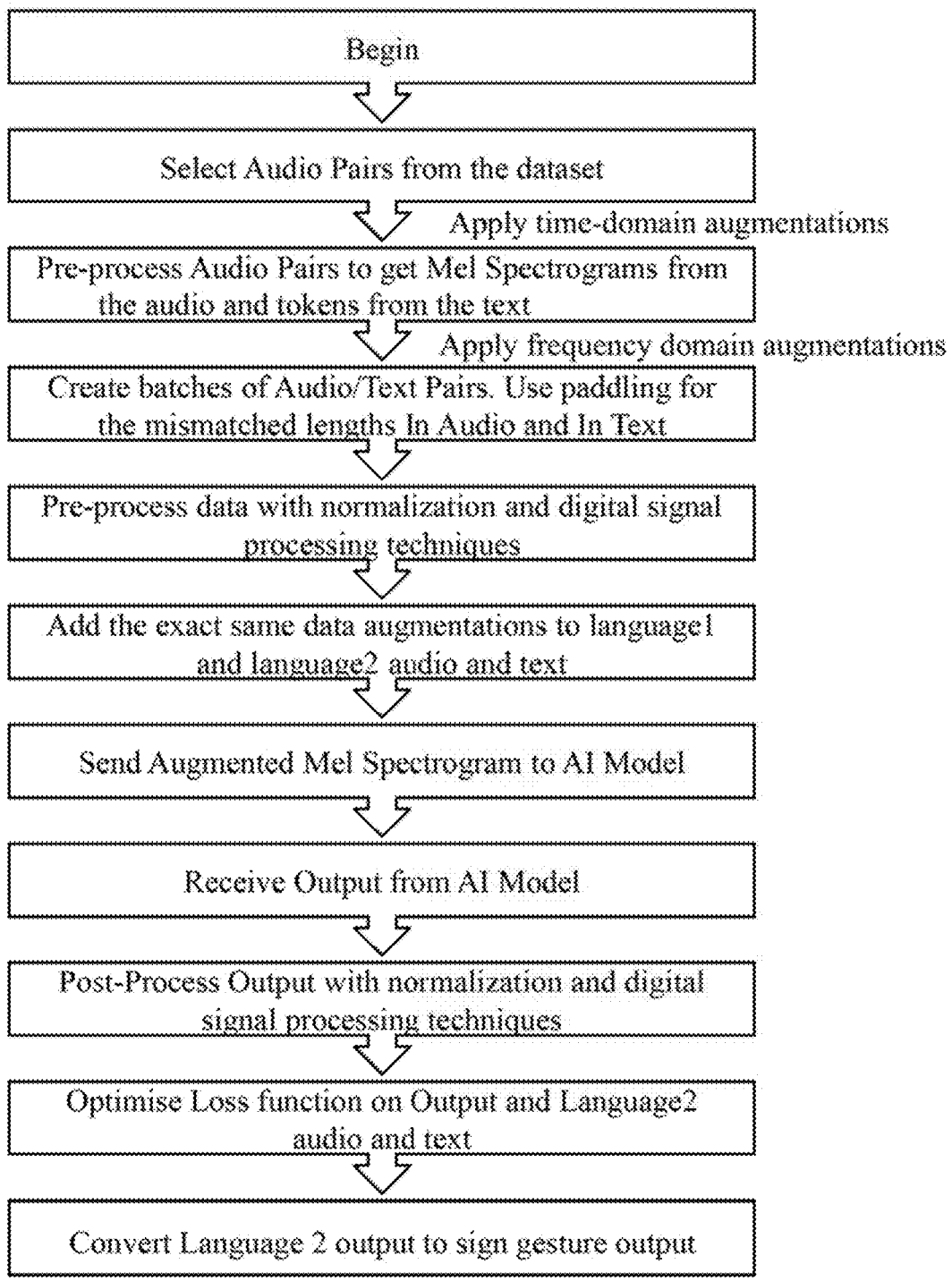
FIG. 3 is flow diagram illustrating training mechanism of the translation system speech-to-speech translation system, according to an embodiment of the present invention.
Figure 4:
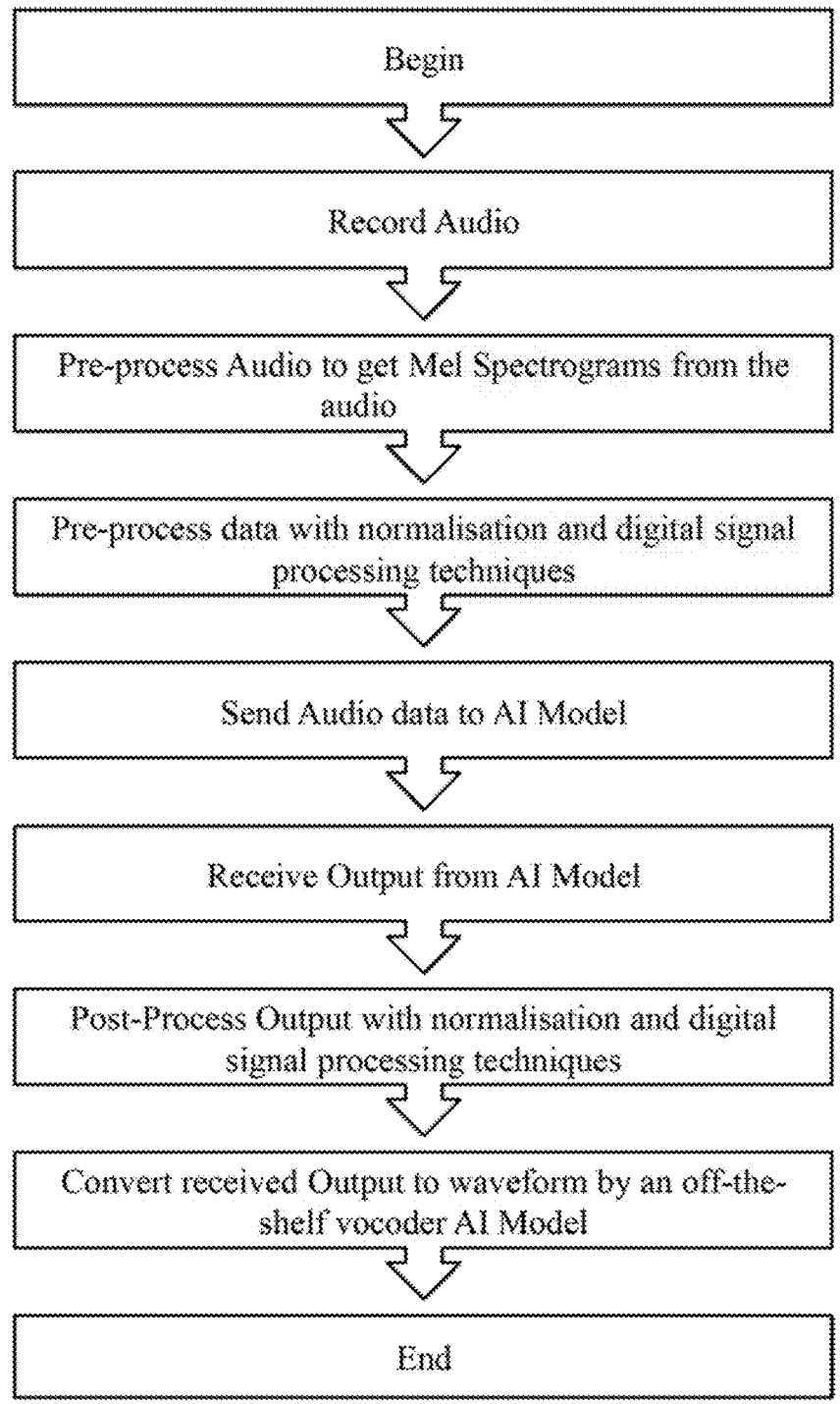
FIG. 4 is flow diagram illustrating Inference mechanism of the translation system speech-to-speech translation system, according to an embodiment of the present invention.

FIG. 3 is flow diagram illustrating training mechanism of the speech to speech translation system and further sign gesture language conversion system, according to an embodiment of the present invention. By applying the time-domain augmentation to the received input audio signal, wherein the input audio signal is a first time domain signal, converting the first time domain signal into a MEL spectrogram; applying the frequency domain augmentation to the MEL spectrogram, Data Augmentation includes techniques such as SpecAugment or any machine-learning, signal processing or statistic-based pre-processing technique that enhances, changes the audio signal, Digital Signal Processing techniques to change the pitch, Echo and other properties that represent characteristics of the audio channel Artificially adding background noise that could include white noise, low-intensity banter, voices of animals, birds, trees or any sounds that do not superimpose the primary signal. In the last step, convert Language 2 output to sign gesture output FIG. 4 is flow diagram illustrating Inference mechanism of the translation system speech-to-speech translation system, according to an embodiment of the present invention.

Figure 5A:
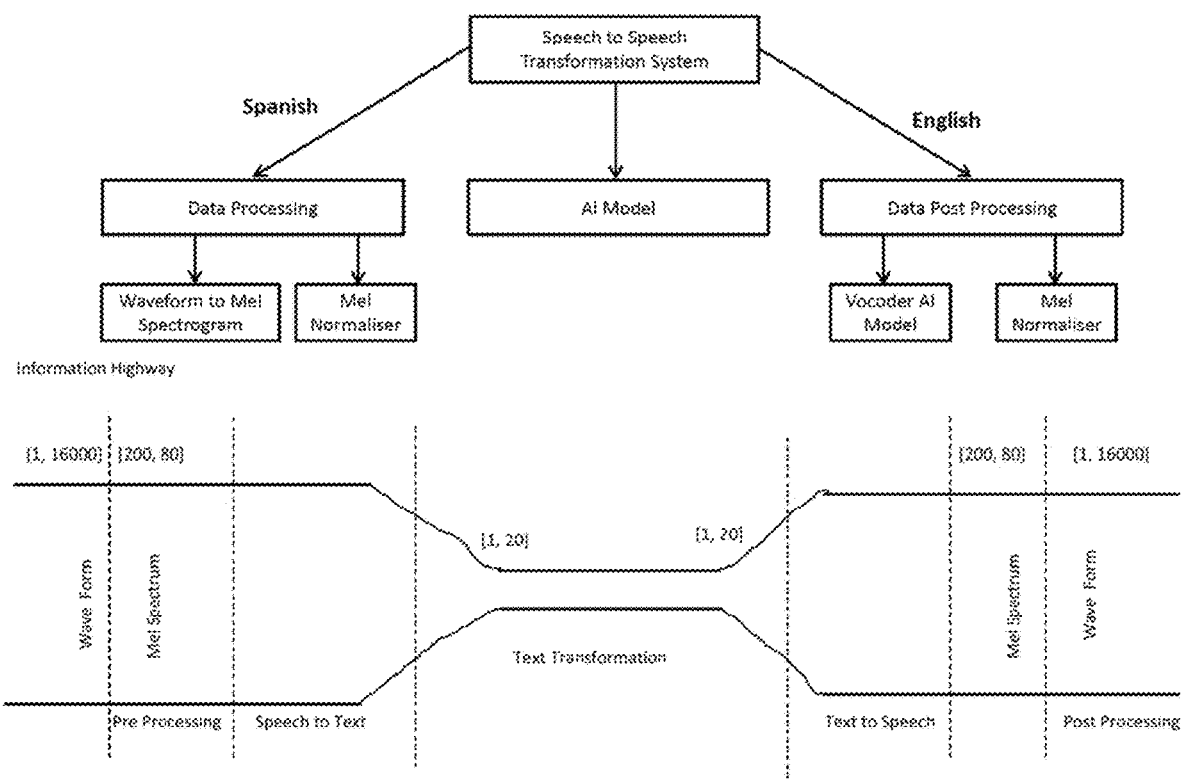
FIG. 5A is a conventional speech to speech translation, according to an embodiment of the present invention.

FIG. 5A is a conventional speech to speech translation. FIG. 5A provides a general overview of speech to speech translation systems of the prior-art. Existing speech to speech translation systems use a three-tier approach, using three services for the task of translation from one spoken language to another. The steps are 1. Speech to text (ASR), 2. Text translation (NMT), 3. Text to speech (TTS). The three models are usually preceded by separate pre-processing steps and succeeded by post-processing steps. For speech to text, the preprocessing steps usually involve signal conversion and audio signal normalization while post-processing steps involve context-normalization. The pre and post processing steps for text to speech involve the same in reverse order.

This architectural setting is prone to a bottleneck that is created after ASR, which converts speech to text, discarding information pertaining to phonetics of the speaker. Hence, the model has this inherent limitation of not being able to take in emotional context and phonetic information of the speaker as it moves along the pipeline. Due to this, errors coming in after ASR are also trickled all the way down to outputs of text to speech. The FIG. 5A. "Conventional Speech to Speech Translation" shows a high-level technical architecture of developing a speech to speech translation system with a conventional pipeline.

Figure 5B:
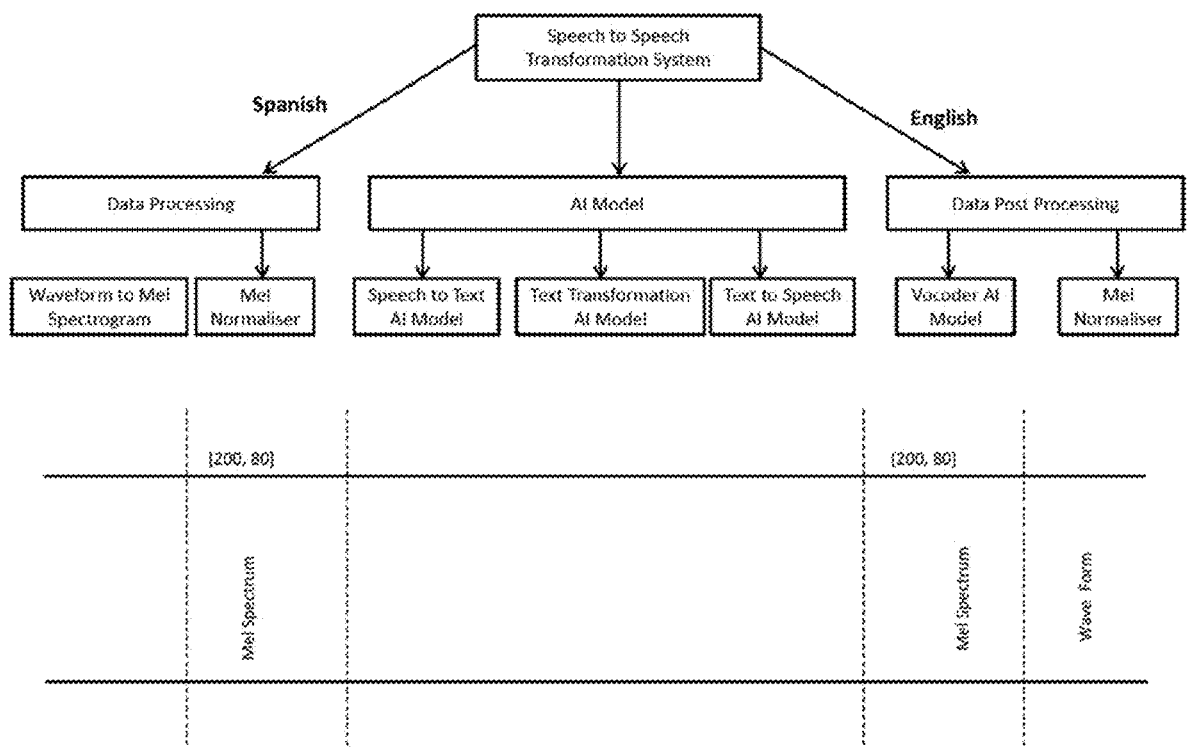
FIG. 5B is Direct Speech to Speech Translation, according to an embodiment of the present invention.

FIG. 5B is Direct Speech to Speech Translation, according to an embodiment of the present invention. Direct speech to speech translation system uses a one-tier approach, creating a unified-model for whole application. The single-model ecosystem takes in audio (mel spectrogram) as an input and gives out audio (mel spectrogram) as an output. The model solves the bottleneck problem by not converting speech directly to text but having text as a byproduct of speech to speech translation, preserving phonetic information along the way. This model also uses pre-processing and post-processing scripts but only for the whole model. The FIG. 5B "Direct Speech to Speech Translation" shows a high-level technical architecture of developing a speech to speech translation system with a conventional pipeline.

Figure 6:
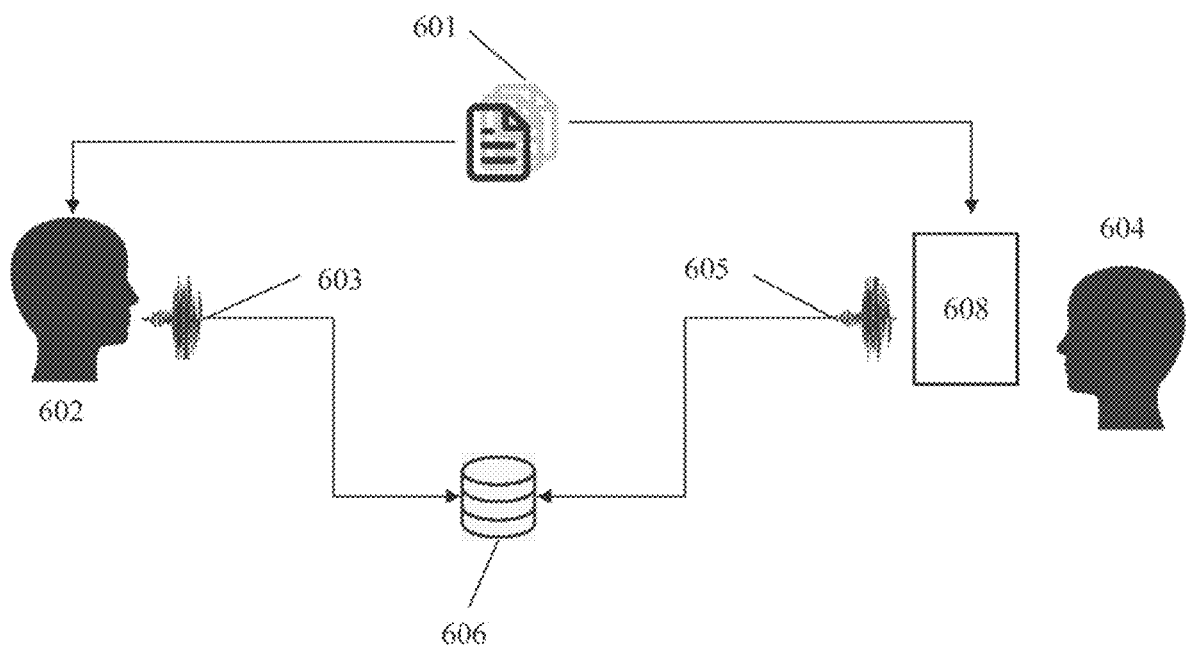
FIG. 6 is the data collection method for a direct speech to speech translation, according to an embodiment of the present invention.

In an embodiment, as shown in FIG. 6, according to which the process of data collection can be performed by two mechanism:

Mechanism 1: Reading a paragraph of information

Collect text paragraphs (textual data that has context and content) in First Language and save to database (601)

Translate text paragraphs into Second Language and save translated text to database (601)

Person 1 (602) reads paragraph in Language 1 (603) with a particular set of emotions, intonation, intent and level of cooperativeness. The paragraph is read in a silent, studio-like environment and then saved in database (606)

Person 2 (604) visualize paragraph in Language 2 (605) ascertaining that the same emotions, intonation, intent, level of cooperativeness are also present in Language 2 using sign gesture language on a sign gesture converter device (608). The paragraph is read in a silent, studio-like environment and then saved in database (606)

Mechanism 2: Collecting the Entire Dataset

The process defined in Mechanism 1 is iterated over the entire dataset spanning over multiple paragraphs Upon performing above, the system creates a batch of data by selecting a subset of data from within the entire dataset. For each sentence from the dataset, gather: Audio in Language 1, Text in Language 1, Audio in Language 2, and Text in Language 2.

FIG. 7 illustrates the generation of a sign language in real-time for hard-hearing people once the speech to speech translation is completed. As show in FIG. 7, let us assume that a person 602 speaks in a language 1 603 which the system converts the language 1 603 in to a different language 2 605, however, upon conversion to different language 2 605, the system further generates a sign language in real-time for hard-hearing people once the speech to speech translation is completed.

To allow the model to generate a sign language in real-time for hard-hearing people once the speech to speech translation is completed, it performs below preferably steps:

recognize a speech language converted by the Speech to Speech model (as discussed above briefly) via a speech-sign converter device and output/generate a sign corresponding to the recognized speech language via a display of the speech-sign converter device.

wherein the speech-sign converter device comprises a sign category keyword comparator configured to compare a pre-stored sign category information having one or more signs (sign gestures) with the outputted/generated sign for the recognized speech language to determine whether the outputted/generated sign is correct, and wherein the sign category keyword comparator transmits a signal related to whether the outputted/generated sign is correct to the speech-sign converter before displaying on the speech-sign converter device.

In an example, a universal sign language notation database may be used for conversion of speech to sign conversion. In another example, any of the existing systems/solutions (for example, app, called GnoSys) that uses neural networks and computer vision to recognize the speech of language speaker, and then smart algorithms translate it into sign can be used to the implementation of the above feature.

In yet another example, an animation corresponding to the outputted/generated sign (gesture) can be generated. The animation is generated using Signing Gesture Markup Language (SigML).

In another example, the speech-sign converter may translate a speech into a sign, and output a result of translation, for example, the sign.

Although the present invention herein has been described with reference to particular preferred embodiments thereof, it is to be understood that these embodiments are merely illustrative of the principles and applications of the invention. Therefore, modifications may be made to these embodiments and other arrangements may be devised without departing from the spirit and scope of the invention, which is defined by the appended claims.

What is claimed is:

1. A real-time speech-to-speech generator and sign gestures converter apparatus, the apparatus comprising:

a transceiver configured to receive an input audio signal in a first language, the input audio signal is a first time domain signal;

a processor configured to:

convert the first time domain signal into a MEL spectrogram;

process the converted MEL spectrogram using one or more Artificial Intelligence (AI) techniques to obtain an output MEL spectrogram of the language translated signal; and convert the obtained output MEL spectrogram into a second time domain signal, wherein the second time domain signal is an output audio signal in a second language; and wherein the apparatus is configured to convert the input audio signal in the first language directly into the output audio signal in the second language without requirement of any speech to text conversion as an intermediate step; and parallelly augment the input audio signal and the MEL spectrogram in the first language equally as it augments the output audio signal and the output MEL spectrogram using a speech augmentation technology;

producing an intermediate output in second language from parallel augmented output;

a speech-sign converter device to converter device configured to recognize the parallel augmented output in second language to output a sign corresponding to the recognized second language via a display of the speech-sign converter device, and wherein the speech-sign converter device comprises a sign category keyword comparator configured to compare a pre-stored sign category information having one or more signs with the outputted sign for the recognized the second language to determine whether the outputted/generated sign is correct; and wherein the sign category keyword comparator transmits a signal related to whether the outputted sign is correct to the speech-sign converter before displaying on the display of the speech-sign converter device;

a speech-sign converter device to automatically generate in real time the converted output audio signal in the second language into a sign gesture to be displayed on a display device.

2. The real-time speech-to-speech generator and sign gestures converter apparatus of claim 1, wherein the speech-sign converter device is configured to recognize the second language to output a sign corresponding to the recognized second language via a display of the speech-sign converter device, and wherein the speech-sign converter device comprises a sign category keyword comparator configured to compare a pre-stored sign category information having one or more signs with the outputted sign for the recognized the second language to determine whether the outputted/generated sign is correct; and wherein the sign category keyword comparator transmits a signal related to whether the outputted sign is correct to the speech-sign converter before displaying on the display of the speech-sign converter device.

3. The real-time speech-to-speech generator and sign gestures converter apparatus of claim 1, wherein the speech augmentation technology augments the audio samples by performing any or a combination of:

synthetically generating a noise from various types of sources and adding them to the voice signal so the input audio signal appears noisy with the noise that gets added to the audio;

artificially manipulating channel parameters, wherein the parameters are at least selected from echo, reverb, pitch, impulse response, placement of source and listeners;

artificially changing the pitch, intonation of the input audio signal;

allowing artificially augmenting the input audio signal by use of another system selected at least from as a neural network, a machine learning technique, statistical methods or digital signal processing methods; and artificially creating room effect by simulating multiple room types and placing noise sources at a single place or multitude of places within a room while placing the listener in a different place that could be either close or far from the noise sources; and artificially adding background noise from real-life collected samples to the input audio signal and the language translated signal.

4. The real-time speech-to-speech generator and sign gestures converter apparatus of claim 1, wherein the noises can include white noise, low-intensity banter, voices of animals, birds, trees or any sounds that do not superimpose the primary signal.

5. The real-time speech-to-speech generator and sign gestures converter apparatus of claim 1, wherein the input audio signal comprises one or more paragraphs spoken by a user in the first language, and wherein the output audio signal comprises one or more translated paragraphs of the one or more paragraphs spoken in the second language.

6. The real-time speech-to-speech generator and sign gestures converter apparatus of claim 1, wherein the input audio signal is split into multiple signals for converting into the MEL spectrogram.

7. The real-time speech-to-speech generator and sign gestures converter apparatus of claim 1, wherein the processor pre-processes the first time domain signal before converting into the MEL spectrogram by using techniques for data augmentation on the first time domain signal.

8. The real-time speech-to-speech generator and sign gestures converter apparatus of claim 1, wherein the processor pre-processes the first time domain signal before converting into the MEL spectrogram by using at least one of machine-learning, signal processing techniques, statistic-based pre-processing technique, Digital Signal Processing techniques, data normalization techniques for data augmentation on the first time domain signal.

9. The real-time speech-to-speech generator and sign gestures converter apparatus of claim 1, wherein the apparatus is configured to convert the input audio signal in the first language directly into the output audio signal in the second language without requirement of any speech to text conversion as an intermediate step.

10. The real-time speech-to-speech generator and sign gestures converter apparatus of claim 1, wherein the apparatus is configured to convert the input audio signal in the first language directly into the output audio signal in the second language by preserving phonetic information and background noise.

11. The real-time speech-to-speech generator and sign gestures converter apparatus of claim 1, wherein the apparatus is configured to be part of a display system with processing units to display the sign gestures of second language translated from first language received over a microphone or over a communication device.

12. A real-time speech-to-speech generation and sign gestures conversion method, the method comprising:

receiving an input audio signal in a first language, the input audio signal is a first time domain signal;

converting the first time domain signal into a MEL spectrogram;

processing the converted MEL spectrogram using one or more Digital Signal Processing (DSP) or Artificial Intelligence (AI) techniques to obtain an output MEL spectrogram of the language translated signal; and converting the obtained output MEL spectrogram into a second frequency domain signal such as a MEL spectrogram, wherein the frequency domain signal is an output signal in a second language;

converting the obtained output frequency domain signal such as a MEL spectrogram into a second time domain signal, wherein the second time domain signal is an output audio signal in a second language; and wherein the real-time speech-to-speech generation and sign gestures conversion methods configured to convert the input audio signal in the first language directly into the output audio signal in the second language without requirement of any speech to text conversion as an intermediate step; and wherein the input audio signal comprises one or more paragraphs spoken by a user in the first language, and wherein the output audio signal comprises one or more translated paragraphs of the one or more paragraphs spoken in the second language; and wherein the one or more paragraphs include textual data that has context and content; and wherein the method is configured to parallelly augment the input audio signal and the MEL spectrogram in the first language by equally as it augments the output audio signal and the output MEL spectrogram using a speech augmentation technology; and producing an intermediate output in second language from parallel augmented output;

a speech-sign conversion method configured to recognize the parallel augmented output in second language to output a sign corresponding to the recognized second language via a display of the speech-sign converter device, and wherein the speech-sign conversion method utilizes a sign category keyword comparator configured to compare a pre-stored sign category information having one or more signs with the outputted sign for the recognized the second language to determine whether the outputted/generated sign is correct; and transmitting a signal related to whether the outputted sign is correct the speech-sign converter before displaying on the display of the speech-sign converter device;

automatically generating in real time the converted output audio signal in the second language into a sign gesture to be displayed on a display device.

13. A real-time speech-to-speech generation and sign gestures conversion method, of claim 12, wherein the speech augmentation technology augments the audio samples by performing any or a combination of:
  synthetically generating a noise from various types of sources and adding them to the voice signal so the input audio signal appears noisy with the noise that gets added to the audio;
  artificially manipulating channel parameters, wherein the parameters are at least selected from echo, reverb, pitch, impulse response, placement of source and listeners;
  artificially changing the pitch, intonation of the input audio signal;
  allowing artificially augmenting the input audio signal by use of another system selected at least from as a neural network, a machine learning technique, statistical methods or digital signal processing methods; and
  artificially creating room effect by simulating multiple room types and placing noise sources at a single place or multitude of places within a room while placing the listener in a different place that could be either close or far from the noise sources; and
  artificially adding background noise from real-life collected samples to the input audio signal and the language translated signal.

14. The real-time speech-to-speech generation and sign gestures conversion method of claim 12, wherein the method further comprising:
  recognizing, by the speech-sign converter device, the second language to output a sign corresponding to the recognized second language via a display of the speech-sign converter device, and
  wherein the speech-sign conversion method utilizes a sign category keyword comparator, configured to compare a pre-stored sign category information having one or more signs with the outputted sign for the recognized the second language to determine whether the outputted/generated sign is correct; and
  wherein transmitting a signal related to whether the outputted sign is correct to the speech-sign converter before displaying on the display of the speech-sign converter device.

15. The real-time speech-to-speech generator and sign gestures converter method of claim 12, wherein the method further comprising: pre-processing the first time domain signal before converting into a frequency domain signal such as MEL spectrogram by using at least one of machine-learning, signal processing techniques, statistic-based pre-processing technique, Digital Signal Processing technique, data normalization technique for data augmentation on the first time domain signal.

16. The real-time speech-to-speech generation and sign gestures conversion method of claim 12, wherein the method further comprising: converting the input audio signal in the first language directly into the output audio signal in the second language by preserving phonetic information and without any speech to text conversion as an intermediate step.

17. A non-transitory computer readable medium to generate a real-time speech-to-speech and sign gestures, comprising:
  a transceiver configured to receive an input audio signal in a first language, the input audio signal is a first time domain signal; and
  a processor; and
  a memory including processor executable code, wherein the processor executable code upon execution by the processor causes the processor to:
  process the converted MEL spectrogram using one or more Digital Signal processing (DSP) or Artificial Intelligence (AI) techniques to obtain an output MEL spectrogram of the language translated signal; and
  convert the obtained output MEL spectrogram into a second frequency domain signal such as a MEL spectrogram, wherein the second frequency domain signal is an output audio signal in a second language;
  wherein converting the input audio signal in the first language directly into the output audio signal in the second language without requirement of any speech to text conversion as an intermediate step; and
  wherein the method is configured to parallelly augment the input audio signal and the MEL spectrogram in the first language equally as it augments the output audio signal and the output MEL spectrogram using a speech augmentation technology; and
  automatically generate in real time the converted output audio signal in the second language into a sign gesture to be displayed on a speech-sign converter device,
  wherein the method configured to recognize the second language to output a sign corresponding to the recognized second language via a display of the speech-sign converter device, and
  wherein the method further comprises a sign category keyword comparator configured to compare a pre-stored sign category information having one or more signs with the outputted sign for the recognized the second language to determine whether the outputted/generated sign is correct; and
  wherein the sign category keyword comparator transmits a signal related to whether the outputted sign is correct to the speech-sign converter before displaying on the display of the speech-sign converter device.

18. A non-transitory computer readable medium to generate a real-time speech-to-speech and sign gestures of claim 17, wherein the speech augmentation technology augments the audio samples by performing any or a combination of:
  synthetically generating a noise from various types of sources and adding them to the voice signal so the input audio signal appears noisy with the noise that gets added to the audio;
  artificially manipulating channel parameters, wherein the parameters are at least selected from echo, reverb, pitch, impulse response, placement of source and listeners;
  artificially changing the pitch, intonation of the input audio signal;
  allowing artificially augmenting the input audio signal by use of another system selected at least from as a neural network, a machine learning technique, statistical methods or digital signal processing methods; and
  artificially creating room effect by simulating multiple room types and placing noise sources at a single place or multitude of places within a room while placing the listener in a different place that could be either close or far from the noise sources; and
  artificially adding background noise from real-life collected samples to the input audio signal and the language translated signal.

19. A non-transitory computer readable medium to generate a real-time speech-to-speech and sign gestures of claim 17, wherein converting the input audio signal in the first language directly into the output audio signal in the second language by preserving phonetic information and without any speech to text conversion as an intermediate step.

* * * * *